(12) United States Patent
Provines

(10) Patent No.: US 9,161,487 B1
(45) Date of Patent: Oct. 20, 2015

(54) HORIZONTAL AUGER GARDEN TILLING APPARATUS AND METHOD OF USE

(71) Applicant: Wynn Provines, Vandalia, IL (US)

(72) Inventor: Wynn Provines, Vandalia, IL (US)

( * ) Notice: Subject to any disclaimer, the term of this patent is extended or adjusted under 35 U.S.C. 154(b) by 0 days.

(21) Appl. No.: 14/515,334

(22) Filed: Oct. 15, 2014

(51) Int. Cl.
*E02F 5/04* (2006.01)
*A01B 33/06* (2006.01)
*A01B 33/16* (2006.01)
*A01B 33/08* (2006.01)

(52) U.S. Cl.
CPC ............... *A01B 33/06* (2013.01); *A01B 33/087* (2013.01); *A01B 33/16* (2013.01)

(58) Field of Classification Search
CPC .... A01B 33/06; A01B 33/087; A01B 33/106; A01B 49/025; A01B 33/16
USPC ................... 172/1, 35, 40, 79, 110, 111, 113; 37/347, 350, 351; 175/203, 323, 394
See application file for complete search history.

(56) References Cited

U.S. PATENT DOCUMENTS

| | | | |
|---|---|---|---|
| 1,027,199 A | 5/1912 | Goodwin | |
| 2,458,241 A | 1/1949 | Beck | |
| 2,815,049 A | 12/1957 | Herscovitch | |
| 3,351,141 A | 11/1967 | Fowler | |
| 3,383,783 A | 5/1968 | Smith | |
| 3,976,147 A | 8/1976 | Cunningham | |
| 4,077,480 A | 3/1978 | Carlson et al. | |
| 4,212,358 A | 7/1980 | Wisbrock | |
| 4,714,149 A | 12/1987 | Tiede | |
| 4,732,227 A | 3/1988 | Wolf et al. | |
| 5,090,486 A | 2/1992 | Jones | |
| 5,396,967 A | 3/1995 | Stewart | |
| 5,507,354 A | 4/1996 | Harleman | |
| 6,056,065 A | 5/2000 | Campbell et al. | |
| 6,299,381 B1 | 10/2001 | Liebrecht, Jr. | |
| 6,889,779 B2 | 5/2005 | Skarlupka, IV et al. | |
| 7,210,543 B1 | 5/2007 | Sumner | |
| 7,357,399 B1 | 4/2008 | Klotz | |
| 2003/0205395 A1 | 11/2003 | Edwards | |
| 2004/0244349 A1 | 12/2004 | Meier et al. | |

*Primary Examiner* — Robert Pezzuto
(74) *Attorney, Agent, or Firm* — Kevin L. Klug

(57) ABSTRACT

A horizontal auger garden tilling apparatus and method of use having an outer frame, an inner frame which pivots with the outer frame, and a rotating auger capable of tilling soil to depth which conventional tillers cannot begin to reach. The apparatus is moved and the method of use is performed via attachment with a tractor or other movable carriage which provides enough horizontal force to move the auger through the soil and provides auger rotational power. A trencher attachment prevents auger soil refilling and allows the apparatus and method of use to be utilized and performed in conjunction with trenching operations.

14 Claims, 15 Drawing Sheets

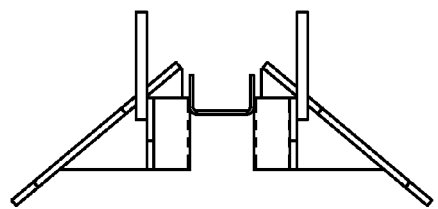
Fig. 9
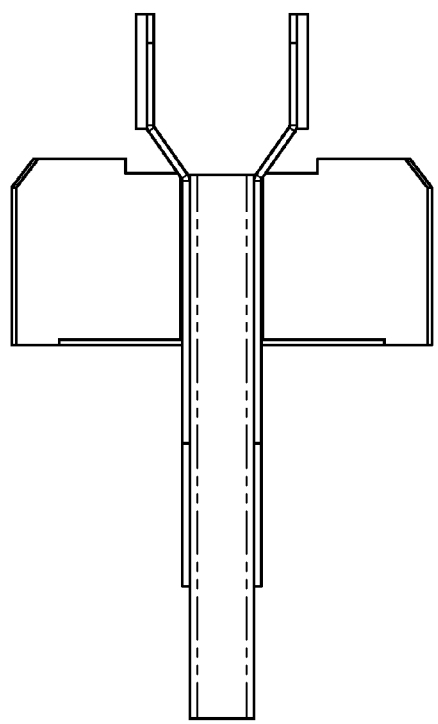 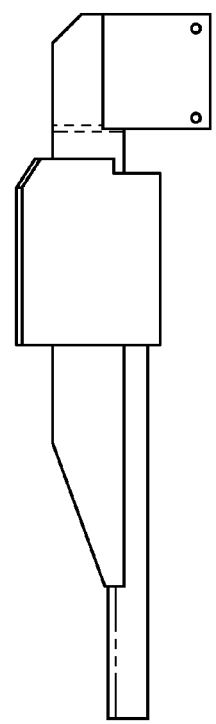
Fig. 10	Fig. 11

HORIZONTAL AUGER GARDEN TILLING APPARATUS AND METHOD OF USE

This application is a continuation of U.S. Ser. No. 14/203,215, filed Mar. 10, 2014, entitled Horizontal Auger Garden Tilling Apparatus and Method of Use. This application also claims priority of U.S. Provisional Patent Application No. 61/777,763, filed Mar. 12, 2013, entitled Horizontal Auger Garden Tilling Apparatus and Method of Use.

BACKGROUND OF THE INVENTION

The art of the present invention relates to powered garden tilling apparatuses and methods of use in general and more particularly to a powered auger apparatus and method of use which is horizontally moveable through the soil and which allows deep tilling of compacted and hardened soils. The present art method of use allows a user to loosen soil in a wide swath with a single pass to a depth which is well below the depths of conventional horticulture, agriculture, or gardening equipment. The apparatus and method of use is available for small or compact tractors and for a powered carriage or walk behind apparatus and allows a method of use which is easy, quick, and relatively effortless.

As most gardeners are aware, the soil in a garden generally requires tilling prior to planting every year. It is understood within the agricultural and horticultural arts that soils often exhibit hard complexes or compaction, often below a topsoil layer. Compaction due to traffic upon the soil may be found from the topmost surface of the soil. Hard complexes, often named "hardpan", maybe found immediately under a shallow layer of topsoil. Within the agricultural and horticultural arts, it is also well understood that tilling loosens the soil and allows for healthy root growth and desirable drainage. Many horticulturists utilize powered garden or rotary tillers in order to till and loosen the soil prior to planting. Unfortunately, conventional garden tillers utilize rotating heads having tines which have a rotational axis substantially parallel with the surface plane of the soil. The aforesaid conventional tillers cannot effectively penetrate the afore described hard complexes or compacted soil. The tines of the conventional rotary tillers dig into the garden soil until a compaction layer or hardpan is reached and generally will not dig or till to a further depth. Instead, conventional garden or rotary tillers often skim or bounce off of the subsurface compacted or hardpan layers without penetration. This is especially true for soils having a high clay content. The result is in an undisturbed or untilled subsurface layer. Unfortunately, an untilled subsurface layer limits the depth of plant root growth and forces a root formation which is more "pancake" shaped rather than the desirable root "ball" shape. When plant roots are limited in the depth of soil penetration, so is the plant health and the fruit or vegetable producing capacity of the plant.

The present art represents an apparatus and method of use which allows a horticulturist or gardener to quickly and easily penetrate and till soil which is compacted or has a subsurface hardpan. That is, the present art apparatus and method allows garden or agricultural tilling to a depth which is much deeper than conventional powered rotary tilling apparatuses and provides a thorough lifting and mixing action of the soil. The present art apparatus and method of use also allows a thorough mixing of fertilizers, organic material, and/or mulch to a depth which heretofore has been unavailable. Also, the present art apparatus and method of use may be utilized in shallow earth trenching operations necessary for burying wire, cable, tile, or pipe. The present art, due to its compact footprint, is able to maker shorter turns and is especially useful in shorter trenching operations where conventional trenchers are too long or cumbersome.

The present art apparatus relates to garden tilling devices and more particularly to an auger apparatus having a substantially continuous flighting which, as a method of use, is pulled or pushed substantially laterally through the soil, either manually, as a wheeled walk behind apparatus with a self propelled option, or with a tractor (preferably a compact tractor) utilizing the three point or other type of hitch and a power takeoff. The walk behind apparatus may further position the auger at an angle relative to the soil surface, whereby the rotating flighting serves to impart a forward force or self propel the apparatus. Conventional prior art powered auger systems are primarily utilized for post holes and have not anticipated or suggested a design or embodiment capable of movement through soil for tilling purposes. That is, prior art powered augers have not provided an apparatus or method of use to hold the auger substantially or reasonably perpendicular with the soil surface while simultaneously applying a lateral, horizontal, or forward force which pulls or rips the auger through the soil. Control of such large lateral auger forces in a safe and repeatable manner has heretofore been unavailable.

Some prior art has shown non-flighted auger like tilling apparatuses such as U.S. Pat. No. 4,621,697 issued to Webb on Nov. 11, 1986 and U.S. Pat. No. D244,682 issued to Miner on Jun. 14, 1977. Nevertheless, the apparatuses purposely do not have the substantially continuous flighting of the present art and could not be utilized with the same method of use as the present art since there is no disclosure to the aforesaid flighting necessary to remove the soil from the tilled trench. At best, the aforesaid simply scratch the surface of underlying compacted or hardpan layers. The strength and supports for the rotating shafts of the prior art are also nonexistent which would severely limit the amount lateral force placement and the depth of tilling. Further prior art earth auger systems having an at least partial continuous flighting are directed to post hole digging and not lateral tilling for horticulturalists. These include U.S. Pat. No. 7,210,543 B1 issued to Sumner on May 1, 2007 and represents a traditional post hole digger, U.S. Pat. No. 7,357,399 B1 issued to Klotz on Apr. 15, 2008 and represents a stand for holding a conventional post hole digger, U.S. Pat. No. 5,507,354 issued to Harleman on Apr. 16, 1996 and represents a post hole digger for drilling through rock laden soils, U.S. Pat. No. 5,090,486 issued to Jones on Feb. 25, 1992 and represents a boring auger having a covering housing and a hydraulic mechanism, US #2003/0205395 A1 published by Edwards on Nov. 6, 2003 and represents an auger which rotates left and right and allows greater flexibility in post hole placement, U.S. Pat. No. 4,732,227 issued to Wolf on Mar. 22, 1988 and represents a twin auger apparatus which drills multiple holes for tree planting, U.S. Pat. No. 3,351,141 issued to Fowler on Nov. 7, 1967 which discloses a stabilizer for a post hole digger, U.S. Pat. No. 2,458,241 issued to Beck on Jan. 4, 1949 and represents a hole boring auger for old side belt tractors, U.S. Pat. No. 6,889,779 B2 issued to Skarlupka, I V et al. on May 10, 2005 and discloses a receiver mounted post hole digger for ATV type vehicles, U.S. Pat. No. 6,056,065 issued to Campbell et al. on May 2, 2000 and represents a hand operated hydraulic motorized hole digger which retracts, U.S. Pat. No. 5,396,967 issued to Stewart on Mar. 14, 1995 with disclosure directed to a pivoting frame hole digger, U.S. Pat. No. 4,212,358 issued to Wisbrock on Jun. 15, 1980 and represents an auger which is pivotable in order to drill holes on an angle, U.S. Pat. No. 4,077,480 issued to Carlson et al. on Mar. 7, 1978 and represents a pivoting frame hole digger which counterbalances the drive motor and power source, and U.S. Pat. No. 3,976,147 issued to Cunningham on Aug. 24, 1976 and represents a wheel mounted hole drilling auger in which the auger pivots on bearing brackets 40.

For a preferred embodiment, the present art apparatus comprises an auger, preferably having twin flights, a gear box held via a inner frame and having an output shaft coupled with said auger, and an input shaft for said auger which is coupled with a rotating power source such as an engine or power take off from a tractor. The twin flighting minimizes wobble and vibration of the apparatus when entering the soil. That is, the stability of the apparatus is enhanced. Alternative auger embodiments may utilize a single flighting or more than two flights. Common to all embodiments is a frame or housing of sufficient strength to withstand the lateral or horizontal forces placed upon the auger and capable of retaining bearings in the inner frame with which the auger shaft is mounted and may rotate. A portion of the frame or housing of the present art apparatus which retains the auger also uniquely and safely pivots out of the soil should an obstruction such as a tree root or rock be encountered. Without some type of safety relief, the present art method of use could present the operator with a bent auger shaft or other disconnected drive components which when rotating could present a danger to the operator. The aforesaid present art elements represent only a few of the many reasons that the prior art cannot be utilized with the method of use of the present art.

Also unique to the present art is a trencher attachment which allows the horizontal auger apparatus to perform trenching for below ground pipe, tile, and cable burying. The trencher attachment portion uniquely prevents any soil extracted by the auger from reentering the location from where it was removed, thereby allowing creation of a trench.

Accordingly, it is an object of the present invention to provide a horizontal auger garden tilling apparatus and method of use which allows an operator to easily and quickly till a garden or other type of a soil to a depth which is substantially below a compaction or hardpan layer.

Another object of the present invention is to provide a horizontal auger garden tilling apparatus and method of use which may be utilized to create trenches for burying wire, cable, pipe, tile, building foundations, or other materials.

A further object of the present invention is to provide a horizontal auger garden tilling apparatus and method of use which may be utilized with a walk behind type of carriage or attached with a tractor hitch and power take off.

A yet further object of the present invention is to provide a horizontal auger garden tilling apparatus and method of use which safely pivots out of the soil should an obstruction such as a tree root or rock be encountered without disruption or failure of the power drive line shafts or couplings or injury to the operator.

SUMMARY OF THE INVENTION

In accordance with the present invention, the first or preferred embodiment represents a horizontal garden tilling apparatus which also functions as a trencher. A preferred embodiment comprises an auger, a pivoting inner frame, an outer frame into which the inner frame fits and is allowed to pivot, and a power drive in the form of a tractor power take off or other rotating power source in conjunction with a movable carriage. The preferred embodiment has a gear box and bearing mount structure attached with the inner frame and the auger extends away from and downward from the bearing mount structure. The extending auger when supplied with rotational power, either via a tractor power take off or via a rotational power source and a moveable carriage, is moved through the soil much as a milling cutter is utilized with a milling machine. The resultant tilling operation allows tilling and soil mixing to a depth heretofore unseen and also allows the apparatus to be utilized for trenching operations.

One or more pivot shafts between the inner frame and outer frame allow the inner frame to pivot upward if the auger encounters a solid object or other obstruction. Preferably the inner frame is held via a shear pin, a shear bolt, or other release mechanism. If sufficient force is placed upon the auger where damage may occur to the apparatus or danger is presented to the operator, the inner frame is released from the outer frame and is allowed to pivot out of the way of any obstruction creating the force. The pivot capability assures apparatus longevity and operator safety.

For trenching operations, a trencher attachment fits with the apparatus and stops the soil from refilling the trench as the auger is pulled through the soil. The trenching attachment utilizes one or more wings or ears to direct the soil as the auger raises the soil to one or both sides of the trench created by the auger. In conditions where the soil surface is sloped or irregular, a floating attachment mechanism is utilized with the trencher attachment in order to allow the wings or ears to move vertically and meet the soil surface.

The present art apparatus and method of use allows a user to easily lower the auger into the soil via tractor three point hitch lift arms or a lift mechanism of a movable carriage and with the locomotion provided by the tractor or movable carriage till the soil to a depth which is highly beneficial for optimum root growth. The rotational power supplied to the auger allows the auger to dig into the soil prior to supplying the locomotion. The locomotion provided allows the flights of the auger to engage the soil in the direction of locomotion and break up the soil for refilling the trench created by the auger or for movement outside of the trench.

BRIEF DESCRIPTION OF THE DRAWINGS

Numerous other objects, features, and advantages of the invention should now become apparent upon a reading of the following detailed description taken in conjunction with the accompanying drawings, in which:

FIG. 9 is a top plan view thereof.

FIG. 10 is a front plan view thereof.

FIG. 11 is a right plan view thereof.

DETAILED DESCRIPTION

Figure 1:
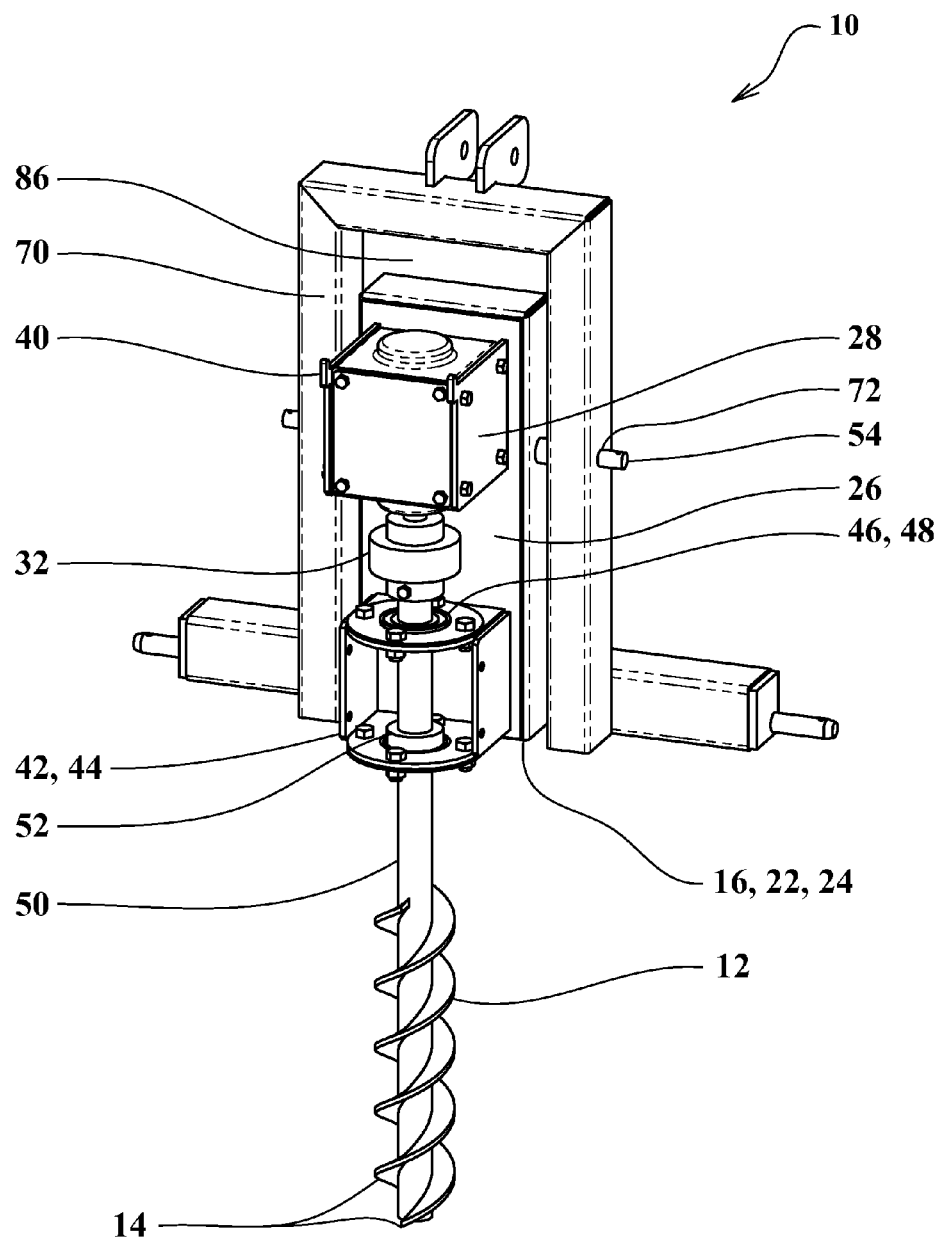
FIG. 1 is a right side perspective view of a first or preferred embodiment of the horizontal auger garden tilling apparatus.
Figure 2:
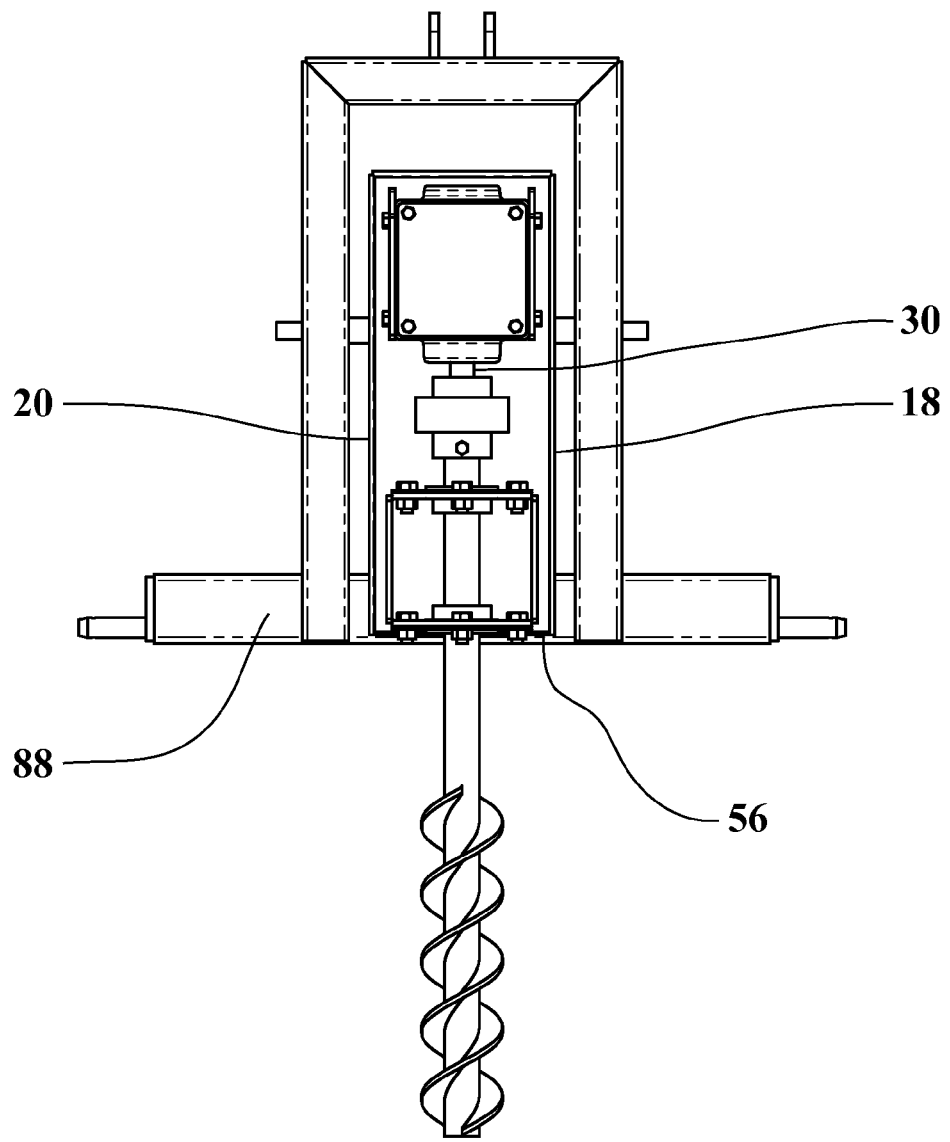
FIG. 2 is a front plan view thereof.
Figure 3:
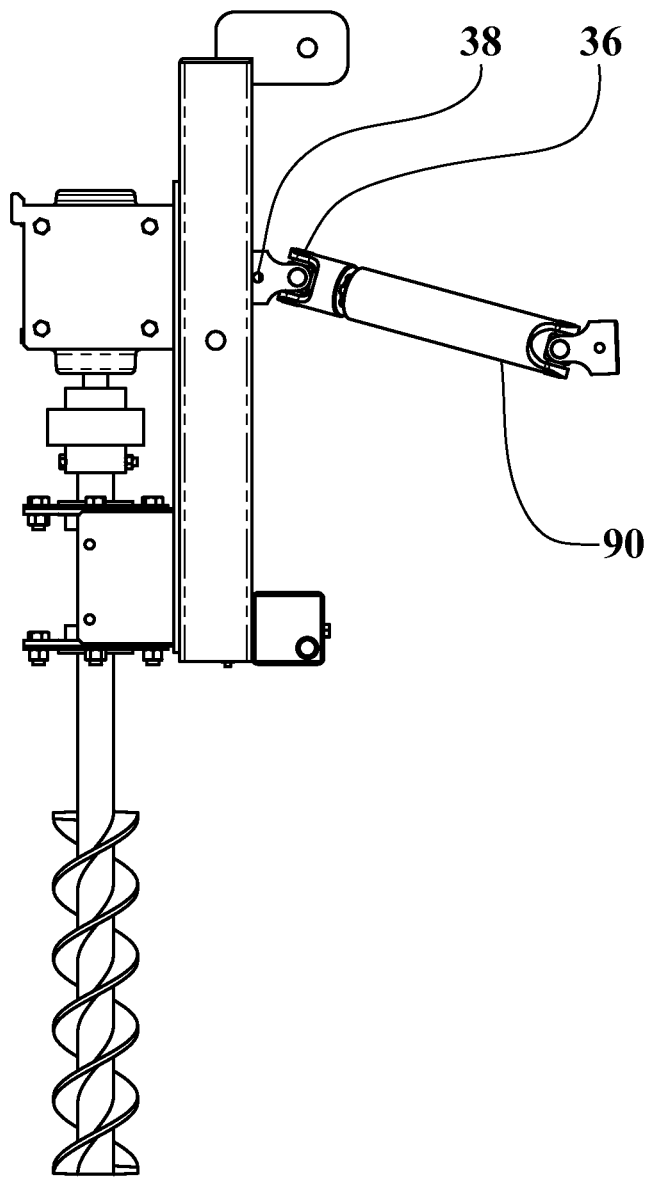
FIG. 3 is right side plan view thereof.
Figure 4:
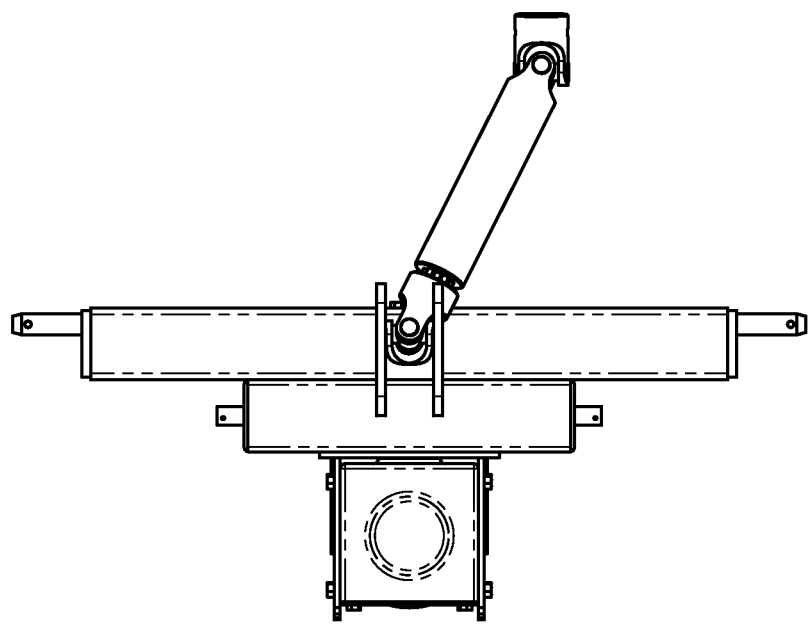
FIG. 4 is a top plan view thereof.
Figure 5:
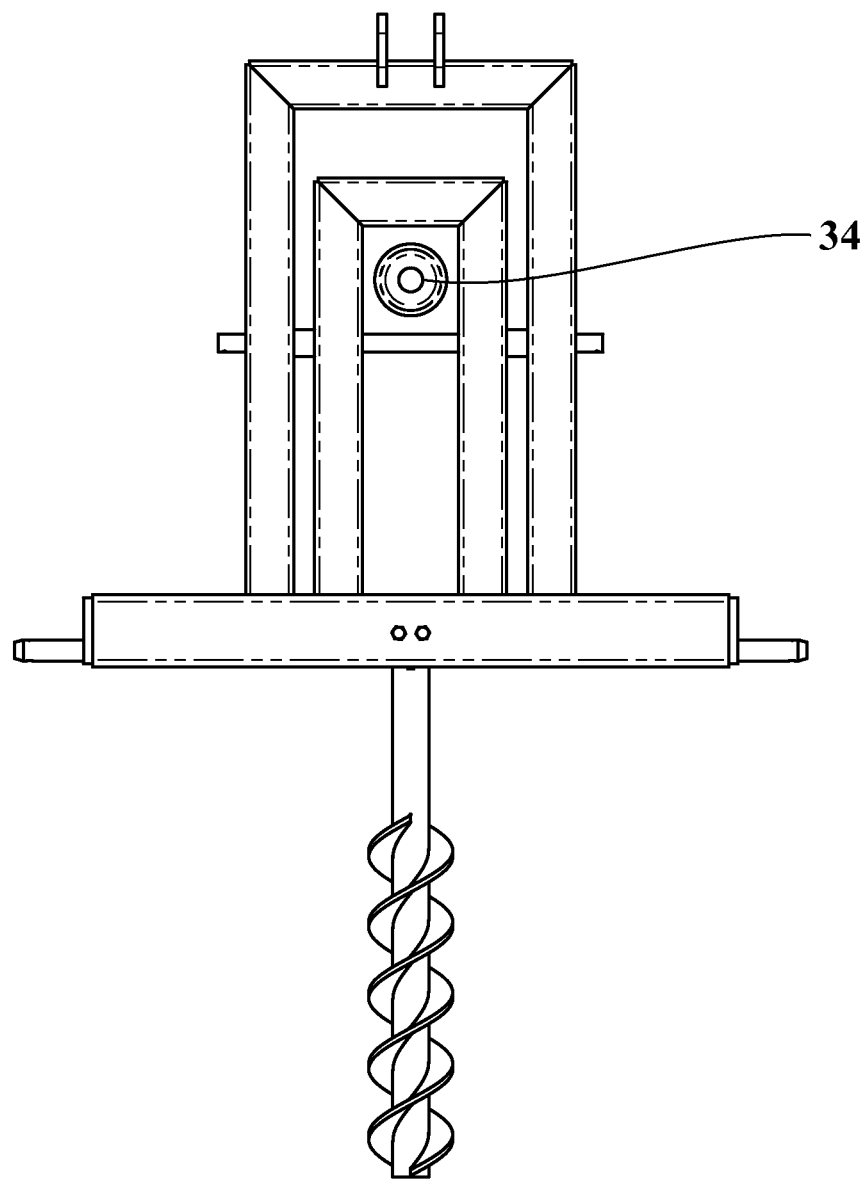
FIG. 5 is a rear plan view thereof.
Figure 6:
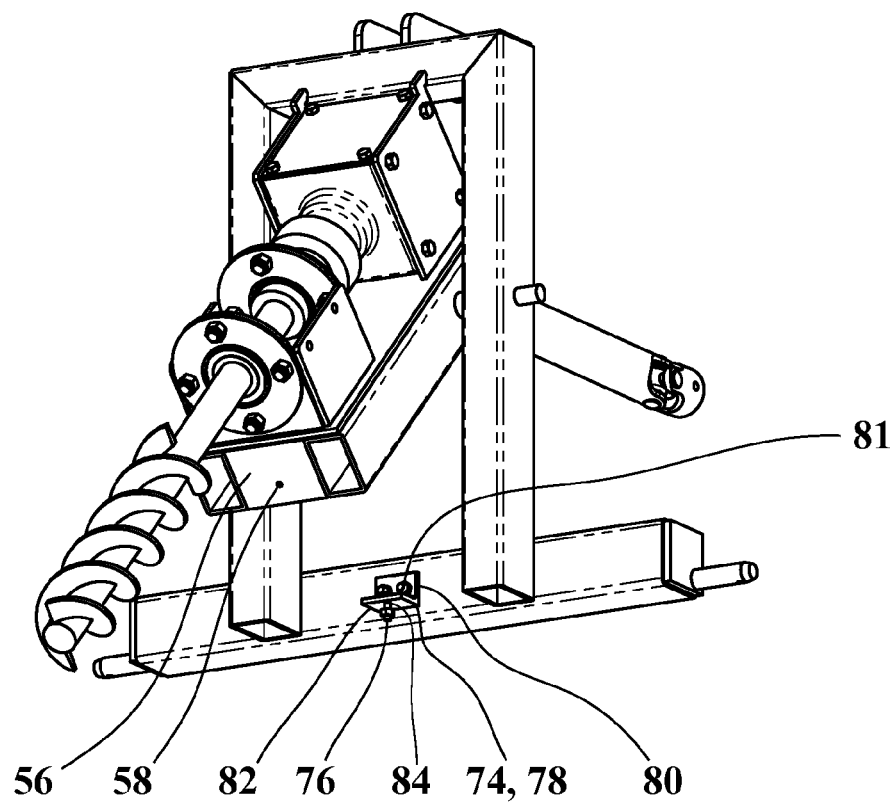
FIG. 6 is a right side perspective view thereof with the inner frame pivoted slightly as would occur if the frame shear pin broke during operation.
Figure 7:
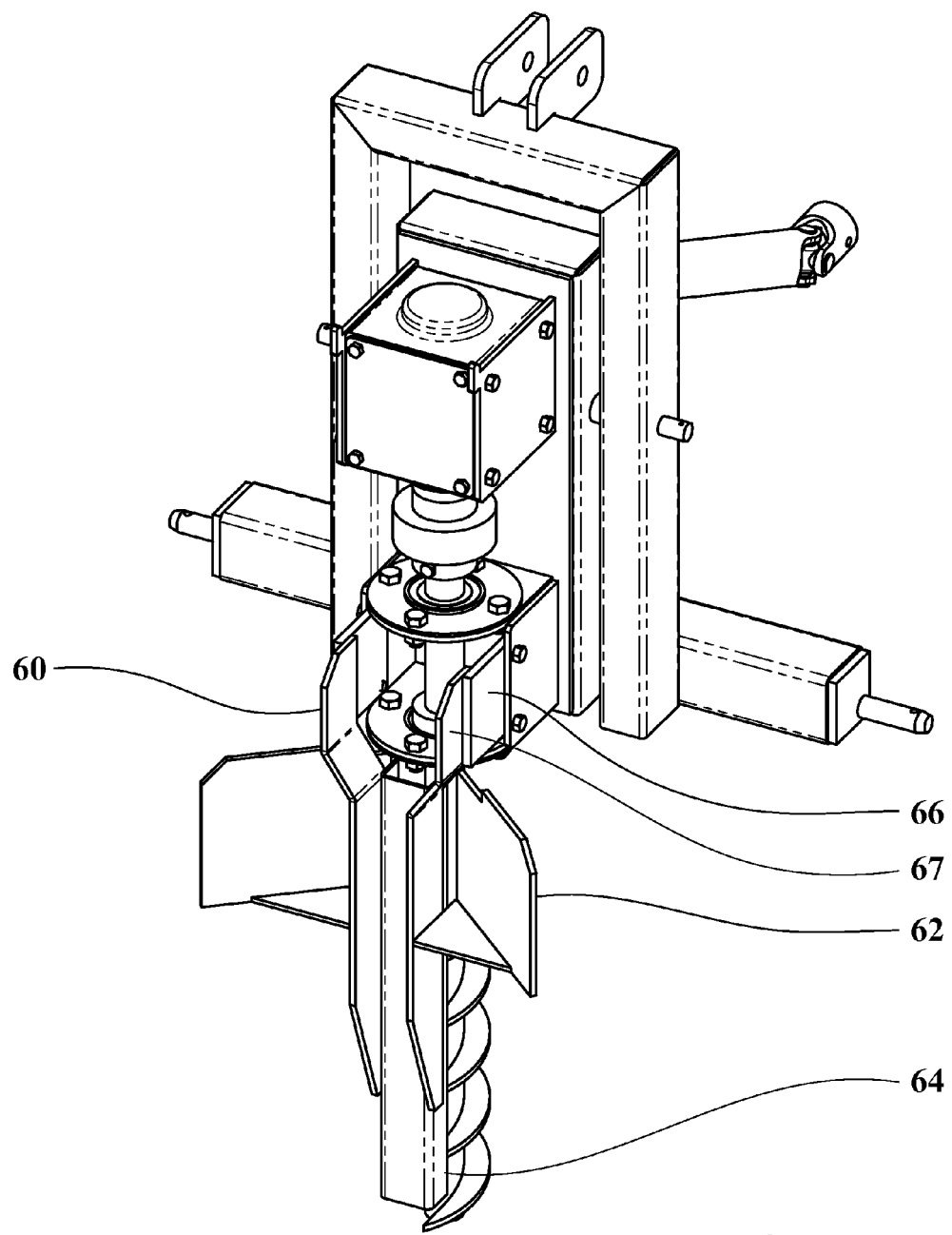
FIG. 7 is a right side perspective view of a second embodiment of the horizontal auger garden tilling apparatus showing the trencher attachment mounted therewith.
Figure 8:
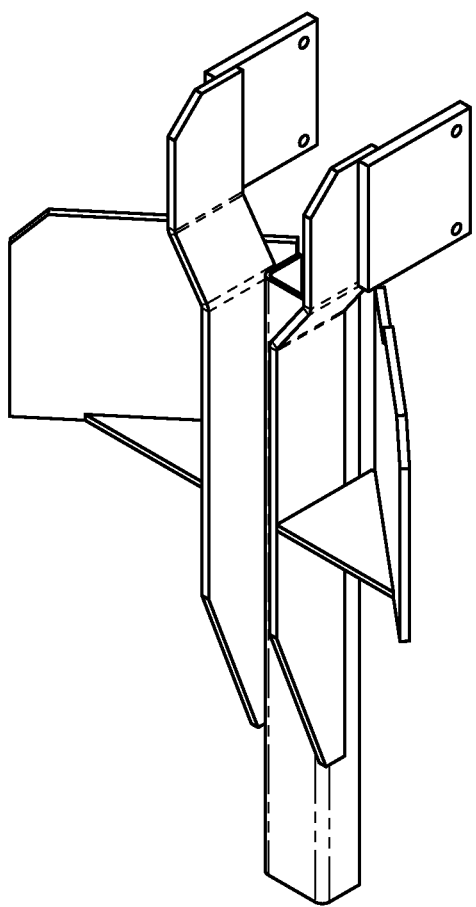
FIG. 8 is a right side perspective view of the trencher attachment alone.
Figure 12:
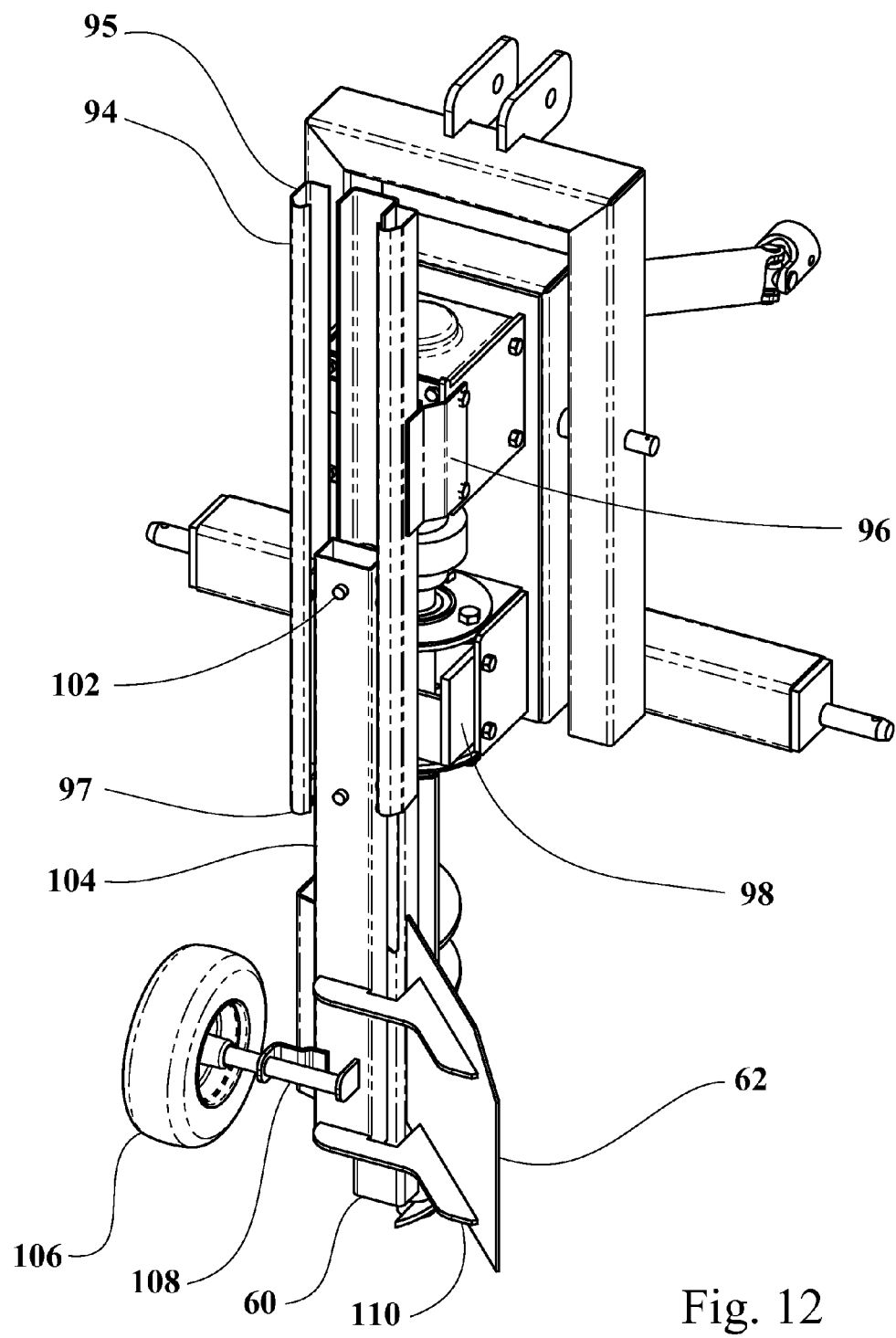
FIG. 12 is a rear right perspective view of a third embodiment of the horizontal auger garden tilling apparatus showing the trencher floating attachment mounted therewith.
Figure 13:
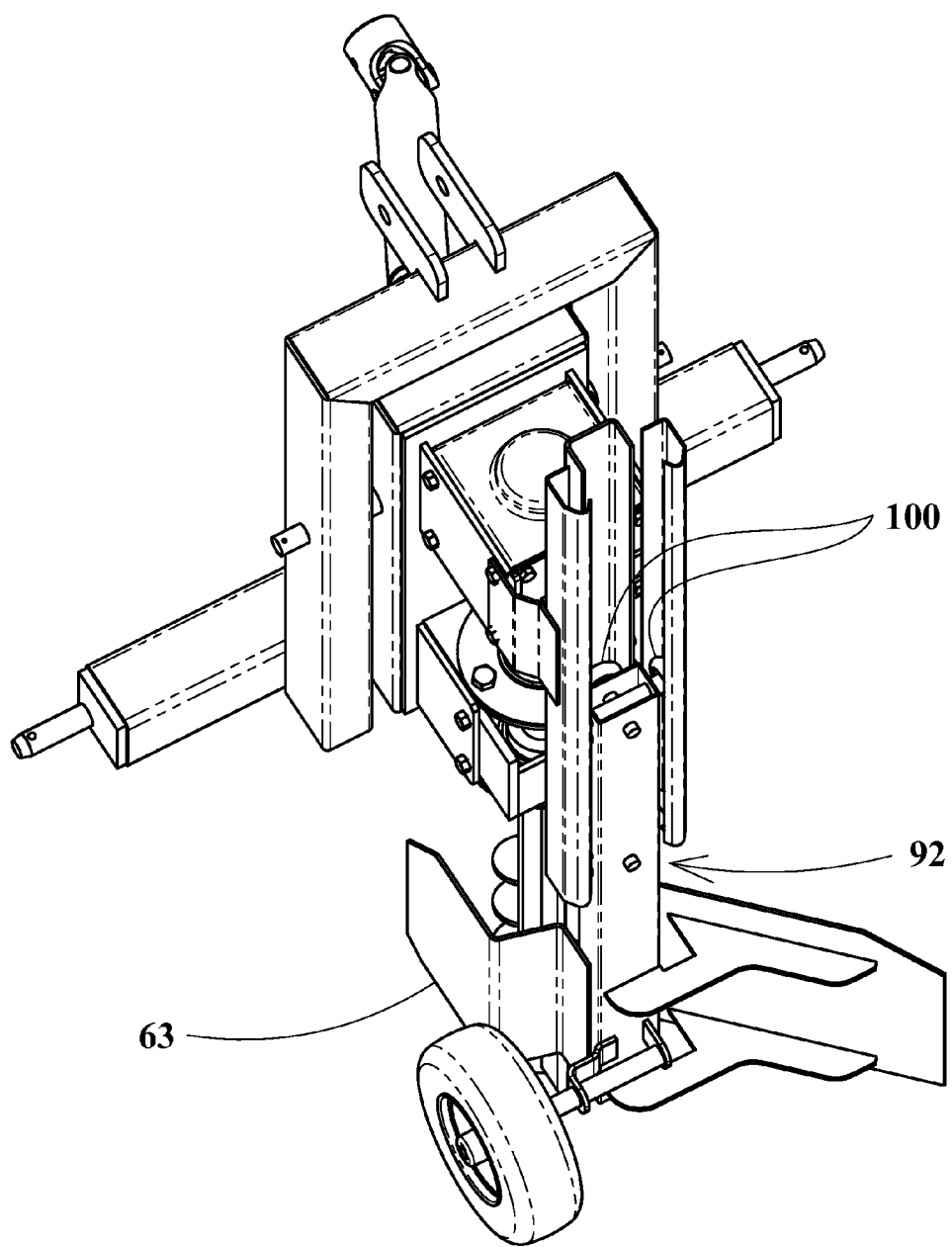
FIG. 13 is a top rear left perspective view thereof.
Figure 14:
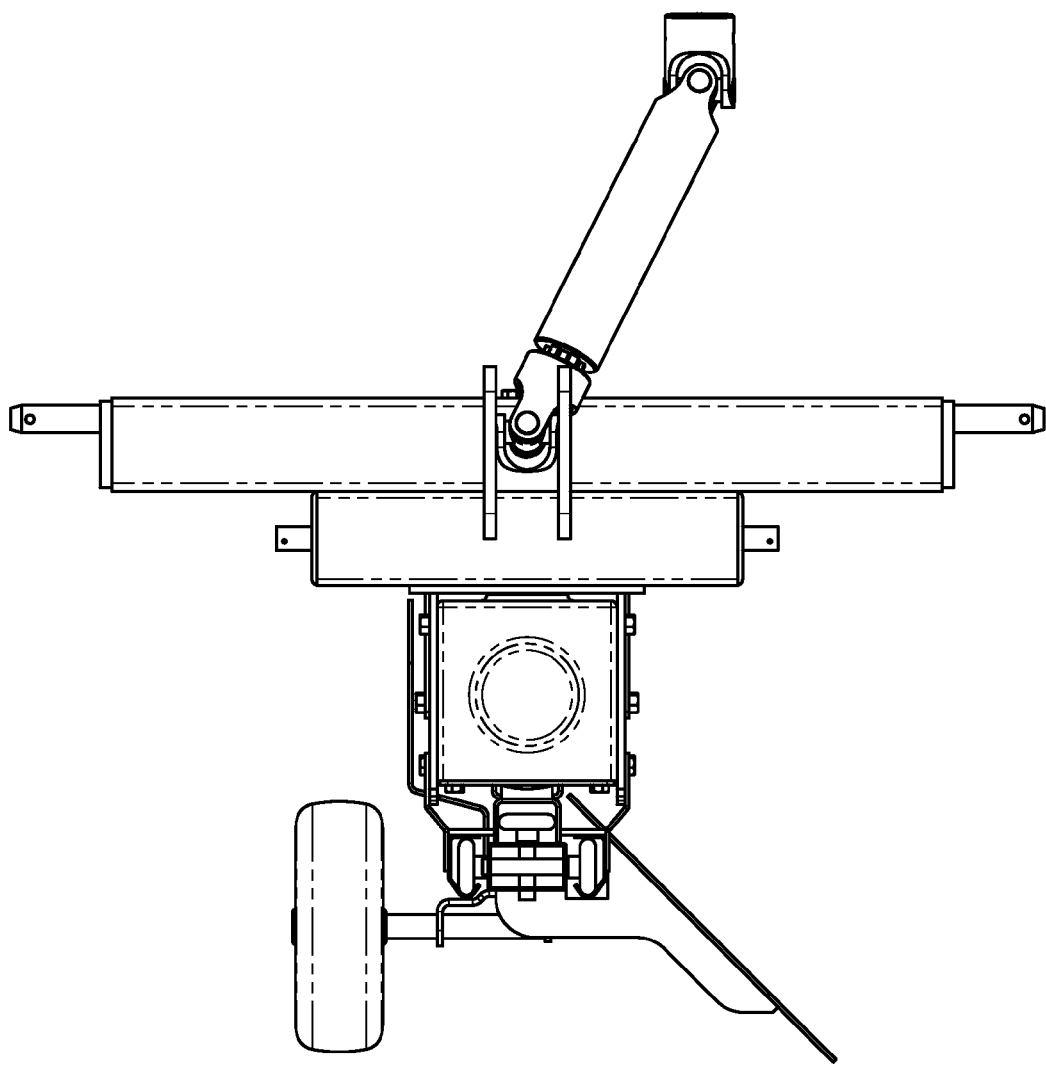
FIG. 14 is a top plan view thereof.
Figure 15:
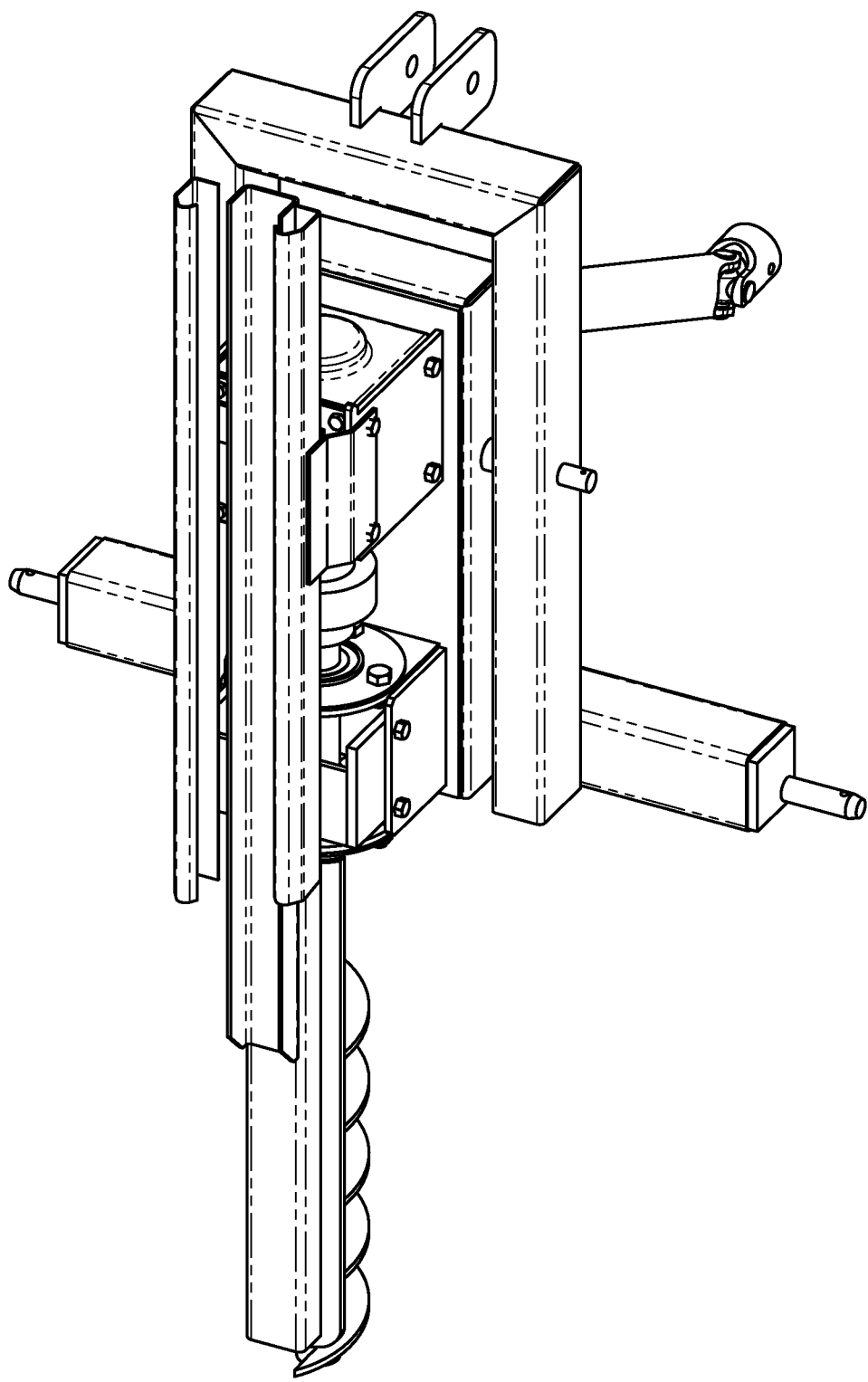
FIG. 15 is a right perspective view thereof without the roller tube and associated elements.
Figure 16:
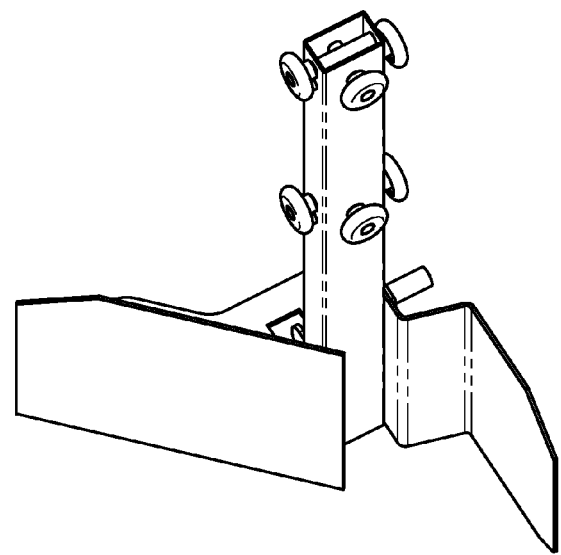
FIG. 16 is a front perspective view of the roller tube and associated elements.
Figure 17:
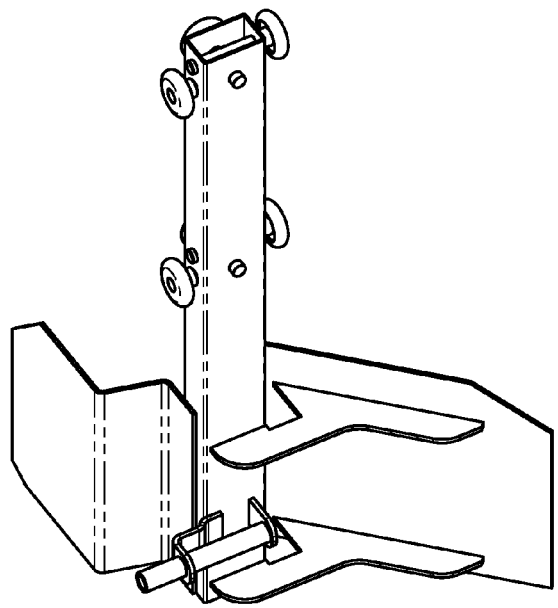
FIG. 17 is a rear perspective view of the roller tube and associated elements.
Figure 18:
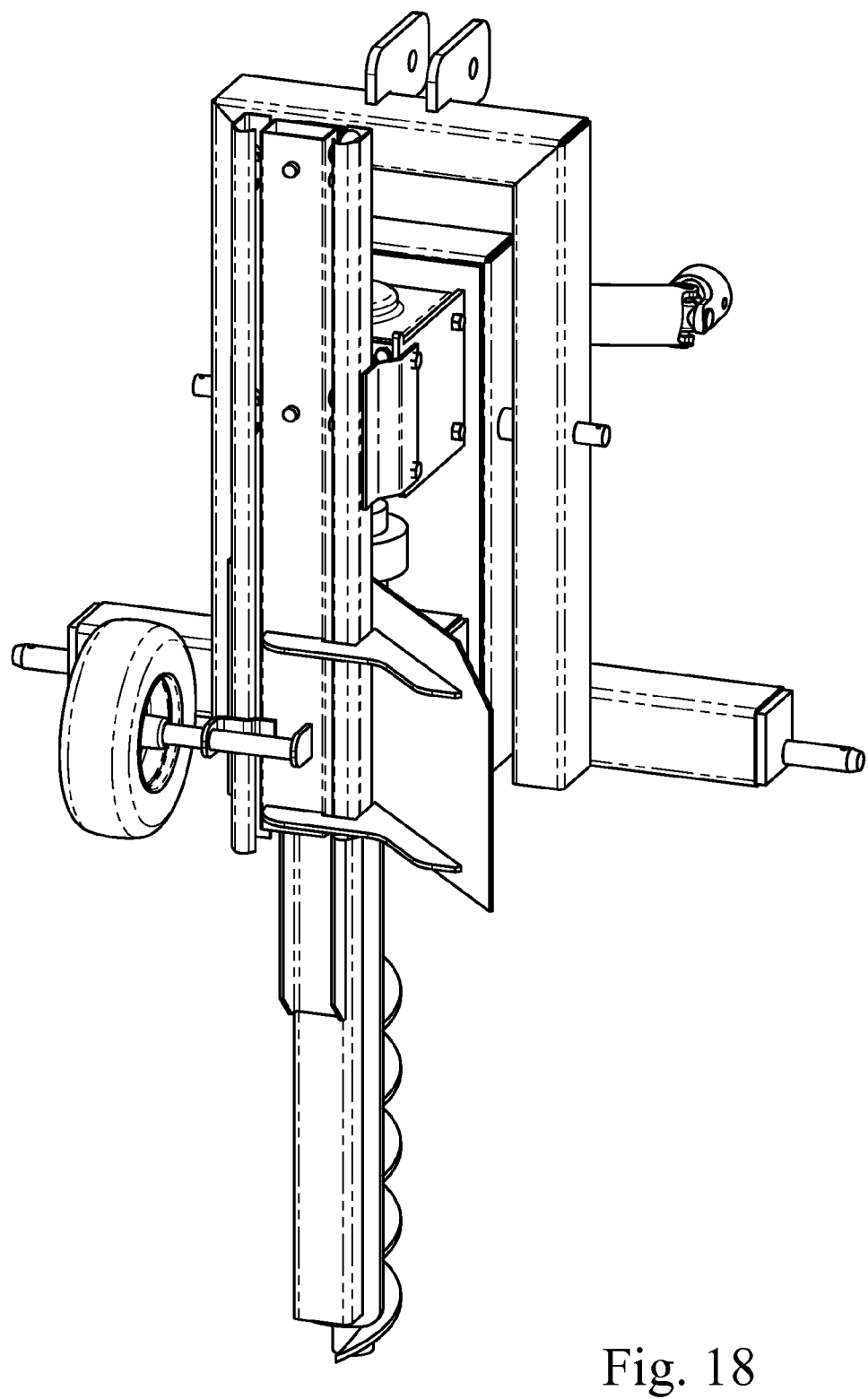
FIG. 18 is a rear right perspective view of the third embodiment of the horizontal auger garden tilling apparatus showing the trencher floating attachment mounted therewith in a lifted position.

In accordance with the present invention, the first or preferred embodiment horizontal auger garden tilling apparatus 10 comprises a pivoting inner frame 16 onto which is mounted a gear box having an output shaft 30 coupled with an auger shaft 50. The auger shaft 50 is rotationally held via a bearing mount assembly 42 between the gear box 28 and the flights 14 of the auger shaft 50. The bearing mount assembly 42 is secured with the inner frame 16 and holds one or more bearing assemblies 46 which allow the auger shaft 50 to rotate but limits any movement of the auger shaft 50 relative to the inner frame 16. The bearing mount assembly 42 may take a plurality of forms which are capable of holding the bearings 48 in a substantially fixed position relative to the inner frame 16. These include but are not limited to pillow block bearings, mounted bearings, flangette bearings, flanged bearings, pressed bearings, and sleeved bearings. For the preferred embodiment, the bearings 48 are flanged bearings mounted via bolts with a box structure 44 to form the bearing mount assembly 42 which is welded with the inner frame 16. Alternative embodiments may limit or forego use of the bearing mount and rely solely on bearings within the gear box 28 for auger shaft 50 support.

The gear box 28 has a power input shaft 34 and an output shaft 30 which couples with the auger shaft 50. For the preferred embodiment, the gear box 28 represents a right angle speed or gear reducer which couples the rotational torque from the power source at the input shaft 34 at a substantially right angle to the output shaft 30 which is coupled with the auger shaft 50. This arrangement allows the auger shaft 50 to remain substantially vertical or upright in the soil during operation. Angular speed reduction is not required for the present embodiment as the typical 540 RPM angular velocity of a power takeoff is adequate to perform the method of use for the present apparatus 10, thus making the gear reducer ratio approximately 1:1. Nevertheless, speed reduction may be incorporated when the power source feeding the input shaft 34 will operate at higher rotational velocities than desired for the auger 12, such as occurs with an engine or motor. Also, a speed increase will be necessary if the power source feeding the input shaft 34 is slower than desired for the auger 12, such as with a hydraulic motor.

The inner frame 16 may take a plurality of forms provided the materials and thicknesses thereof are sufficient to hold the aforesaid components and the rotational torque and lateral forces associated with the method of using the present art. For a preferred embodiment, the inner frame represents a substantially rectangular steel frame 22 having a left side 18, right side 20, and a bottom side 56 at least partially formed from square steel tubing 24 with a steel plate 26 overlaid upon which the aforesaid bearing mount assembly 42 and gear box 28 are mounted. Alternative embodiments may be manufactured from plurality of stock and in a plurality of forms.

The inner frame 16 also has one or more pivot shafts 54 protruding from a left 18 and right side 20 or which feed through said left 18 and right side 20. The pivot shafts 54 pivotally mate with an outer frame 70, preferably through pivot holes 72 therein, which allows the apparatus 10 to mount with a tractor or other moveable power source, especially a three point hitch found on most tractors. The pivotal mating with the outer frame 70 which is mounted with the moveable power source is essential for operator safety and equipment longevity when utilized during the present art method of use. That is, as the auger 12 is laterally moved through the soil during the present method of use, the auger 12 may encounter numerous solid objects or obstructions such as rocks, buried pipes, etc. which cannot be disintegrated or pulverized with the auger 12 and that require the auger 12 to be quickly moved from and around the object for operator safety and equipment longevity. The pivot action of the inner frame 16 relative to the outer frame 70 during the present method of use assures the operator that the auger 12 will ride over the object. The inner frame 16 may also pivot to increase the ground clearance of the auger 12 which allows a longer auger for deeper tillage or trenching. This inner frame 16 may also be rotated on said pivot shafts 54 by a linkage and/or actuator between the tractor draw bar and the three point hitch. Said actuator may take a plurality of forms including but not limited to hydraulic cylinders, electrical actuators, or mechanical actuators.

The outer frame 70 of the preferred embodiment comprises a form which readily attaches with a conventional three point hitch. That is, it has pins extending from a lower portion which mate with pivoting holes within the three point hitch lifting arms and a slot into which the top link fits and is held via a pin through a hole in the top link and slot, all as found with conventional three point implements. Centrally, the outer frame 70 has a void 86 into which the inner frame 16 fits and is held via the pivot shafts 54 with separation between the frames in order to avoid user hand or finger pinching. Preferably, one or more bushings or spacers are placed between the inner frame 16 and the outer frame 70 in order to maintain said separation between the two and also avoid binding. Alternative embodiments may attach with a motorized moveable carriage in lieu of attachment with a tractor.

In furtherance of the aforesaid and for a preferred embodiment, a shear tab 74 and bolt 76 is provided near a location where a bottom side 56 of the inner frame 16 meets with a base 88 or bottom portion of the outer frame 70 during the non-pivoted and normal method of use. Alternative embodiments may place said shear bolt at a plurality of locations between the inner 16 and outer 70 frame. The shear tab 74 is preferably an angle member 78 having a second leg 80 which is attached with the base 88 of the outer frame 70 and a first leg 82 extending from the base 88 with a shear pin hole 84 for a shear pin or bolt 76. For a preferred embodiment, a shear pin or bolt 76 is placed through the first leg 82 shear pin hole 84 and into a shear pin receiving hole 58 withing the bottom of the inner frame 16. During operation with the present art method, should the auger 12 encounter a solid object or obstruction, the shear pin or bolt 76 will shear or break and allow the inner frame 16 to pivot relative to the outer frame 70 which is mounted with the tractor or moveable power source. The pivot angle of the auger 12 allows an upward force upon the auger 12 due to the forward motion of the apparatus 10 and allows the auger 12 to move up and over the obstruction. This is especially important for three point hitch operation as the lower or lifting arms of a three point hitch generally float upward after adjusted to a lower position by the operator. This allows the lifting arms to move upwards as the auger 12 moves over an obstruction.

The shear tab 74 is preferably bolted to the inner frame 16 with two bolts although may be attached in a plurality of ways within alternative embodiments. The distance between the shear tab and the inner frame 16 is preferably adjustable fore and aft with the use of spacer washers. The washers are selected so as to hold the inner frame 16 secure with the outer frame 70 when the bolts are tight thereby preventing movement between the inner 16 and outer frames 70 while in use. The aforesaid tightness also makes replacement of a failed frame shear bolt 76 difficult. Thus, to replace the shear bolt, the two adjusting bolts 81 are loosened enough to create a clearance between the frames. This clearance then allows insertion of the replacement shear pin or bolt 76. After the frame shear bolt 76 is in position, the two adjusting bolts 81 are tightened to hold the inner 16 and outer frames secure.

Proper placement of the pivot shaft(s) 54 relative to the axis of the gear box 28 input shaft is essential for a proper method of use. That is, when the frame shear bolt 76 or pin shears or breaks, the input shaft 34 axis cannot exceed more than approximately 45 degrees relative to the power drive shaft 90 axis as the power drive shaft 90 is typically coupled with the input shaft 34 via a "U" joint 36 and the input shaft 34 preferably has limited displacement (i.e. fore or aft movement) for "U" joint 36 preservation and to prohibit separation or over compression of the inner and outer power takeoff drive shafts 90. Placement of the pivot shaft(s) 54 towards a top portion of the inner frame 16 allows minimal movement of the "U" joint 36 should the frame shear bolt 76 or pin shear or break. Also for the preferred embodiment, a motion limiter 40 having one or more limits or limiting tabs 40 placed upon the gear box 28 contact the outer frame 70 and limit angular movement of the inner frame 16 to the aforesaid approximate 45 degrees. The motion limiter 40 may take a plurality of forms in alternative embodiments provided inner frame 16 movement is limited as discussed. Also for a alternative embodiments, the pivot shaft(s) 54 may be placed at a plurality of locations of the inner frame 16 without departing from the scope and spirit of the present art apparatus 10.

As discussed, the input shaft 34 of the gear box 28 may be driven with a plurality of rotational power sources including but not limited to a tractor power takeoff, a hydraulic motor, a conventional engine, or an electric motor. Also with any of the aforesaid, a power drive shaft 90 may be utilized or the aforesaid may be directly coupled with the input shaft 34 of the gearbox 28 or the auger 12 directly. Although the preferred embodiment substantially or at least partially centers the axis of the auger 12 with the center axis of the tractor, carriage, or rotational power source, alternative embodiments may offset the center axis of the auger 12 for a plurality of reasons including but not limited to auger 12 side torque control. Further alternative embodiments may utilize two or more augers 12 in a side-by-side or other relationship which are rotating in the same direction or counterrotating.

For a preferred embodiment the "U" joint 36 is held with the input shaft 34 via a shaft shear pin 38 which will shear or break if the apparatus 10 rotationally binds. Preferably a snap ring placed onto grooves within the input shaft 34 and through slots within the "U" joint 36 holds the "U" joint in place should the shaft shear pin 38 break. The "U" joint 36 may also be held via a left hand thread within the input shaft 34 into which a left hand bolt is threaded with a washer holding the "U" joint 36. As understood within the art, the power drive shaft 90 may be safely held with the input shaft 34 via a plurality of accepted methods including but not limited to slip clutches, splines, frictional fits, constant velocity joints, or torque limiting couplers.

An alternative embodiment has the flighting 14 on the auger 12 bolted via tabs to the auger shaft 50 rather than the traditional welding. The bolting allows for quicker and easier replacement of the auger 12 flights 14 when necessary. The auger 12 preferably has twin flights 14 at least near the bottom of the auger 12 where it enters the soil in order to minimize the vibration and side torque when entering the soil, and further stabilize operation. The twin flighting 14 may extend fully toward the bearing mount assembly 42 or simply a half or more turn and then transition into a single flighting or may have a tapered or straight outer envelope along the auger 12 length. The auger 12 flighting 14 length on the auger shaft 50 may vary depending upon the application from a few inches to tens of feet. For alternative embodiments, the auger 12 may also have a cone shaped pointed end or a more traditional flat end with or without flighting, all of which may be removable or affixed. The flighting 14 may also have a plurality of profiles including but not limited to smooth, cupped, serrated, toothed or protruded portions, and have various diameters. The auger shaft 50 may also have a plurality of profile cross sections including but not limited to tubular, round, square, hexagonal, or other partial or full polygonal forms. A further alternative embodiment has the auger as a bare shaft onto which a tube having flighting 14 fixed to the tube slips over said auger shaft and is bolted via one or more holes through the auger tube and auger shaft.

For the preferred embodiment, the auger shaft 50 is coupled with the output shaft 30 of the gear box 28 via a conventional chain coupler or shaft coupler 32. That is, the output shaft 30 and the auger shaft 50 both have a sprocket around which a double row chain with a master link is placed and secured. As understood within the arts, the coupler allows for a slight misalignment between two shafts without degradation to the bearings 48 which hold each. Alternative embodiments may utilize a plurality of auger shaft 50 to gear box 28 output shaft 30 couplings including but not limited to splines, rigid couplers, constant velocity joints, or jaw couplers. A further alternative embodiment hollows the gear box 28 output shaft 30 and allows the auger shaft 50 to extend partially into or fully through the gear box 28.

For the preferred embodiment, the auger shaft 50 is held vertically with the assembly via a shaft collar 52 placed above one or more of the bearings 48 within the bearing mount assembly 42. Shaft collars are readily understood within the arts and generally frictionally hold onto a shaft via a setscrew impinging upon the shaft or compressing the collar in the case of a split shaft collar. Alternative embodiments may utilize a plurality of auger shaft 50 retention means, with or without said shaft collar 52, including but not limited to bushings, bosses, heads, pins, bolts, or quick release mechanisms for two piece auger shafts 50.

In addition to the tilling function of the present art apparatus 10, a trenching operation may be performed with the addition of a trencher attachment 60. Without the trencher attachment 60, any soil removed by the auger 12 substantially refills or backfills the void left behind and by the auger 12 as the auger 12 moves through the soil, much as a mixer functions with a raw cake batter. The trencher attachment 60 substantially blocks any backfilling and diverts the loosened soil to the sides of the auger 12 and the created trench and further prohibits backfilling.

The trencher attachment 60 attaches with the inner frame 16 or a portion thereof such as the bearing mount assembly 42. This allows the trencher attachment 60 to pivot with the auger 12 should an obstruction be encountered. For the preferred embodiment, the trencher attachment 60 has two extending ears or wings 62 on each side which are canted slightly rearward. Although shown as substantially flat, the extending ears or wings 62 may take a plurality of forms including but not limited to rounded, "V" shaped, triangular, or other shapes which allow soil to be directed away from the trench created by the auger 12 and may be adjustable in height, angle, and length or simply float notwithstanding the auger 12 depth relative to the soil surface. Further alternative embodiments may utilize a single ears or wing 62. A rear guard or shroud or trough 64 having a partial circular cross section is located behind the direction of motion of the auger 12 and extends substantially the full length of the auger flights 14. Alternative embodiments 64 may be shorter or longer than the auger 12 or auger flights 14. The partial circular cross section substantially conforms to the outer diameter of the auger flights 14, preferably without touching the auger flights 14. The rear guard or shroud or trough 64 substantially prohibits soil from backfilling the trench and forces the auger 12 to lift the soil to the surface where the extending ears or wings 62 may clear the soil from the trench as the apparatus 10 is moved through the soil. For the preferred embodiment, the trencher attachment 60 is held via trencher attachment ears 66 onto the bearing mount assembly 42 via bolts or screws. The attachment ears 66 are connected or attached with trencher supports 67 which hold the aforesaid extending ears or wings 62 and rear guard or shroud or trough 64 together as a single attachment. The trencher attachment 60 elements as afore described may be held together via a plurality of methods including but not limited to welding, brazing, integral forming, pins, or bolts. Alternative embodiments provide adjustment of the distance and/or angle between the auger flights 14 and the rear guard or shroud or trough 64. Further alternative embodiments may utilize a plate or rolling disk placed substantially parallel to the trench wall in order to counteract the torque effects of the auger 12 on the tractor or movable carriage. Still further alternative embodiments may incorporate trailing wings which pull soil back into the trench after pipe, wire, or tile is laid within the created trench.

A still further alternative embodiment utilizes a floating attachment 92 in conjunction with the aforesaid trencher attachment 60. For this embodiment, the floating attachment 92 allows the ears or wings 62 to float upon the soil surface independent of the trencher attachment 60 mounting position. This allows a clean sweep of loose soil from the surface and reliable direction of soil away from the trench and allow the trencher attachment 60 to operate at multiple depths thereby following a drainage grade as necessary for proper tile drainage.

The floating attachment 92 mounts with the inner frame 16, the trencher attachment 60, or a portion thereof such as the trencher attachment ears 66. This allows the floating attachment 92 to pivot with the auger 12 should an obstruction be encountered. Preferably, the float attachment 92 has three rails or tracks 94 that mount with two upper ears 96 and two lower ears 98 to the gear box and the bearing mount assembly 42 respectively. The three tracks 94 combine to form a triangular support that resists fore and aft, side to side, and twisting forces. As expected, the tracks have a top portion 95, a bottom portion 97, and a lengthwise opening through which the shanks of the rollers 100 may pass. Preferably, one or more motion limiters or stops are placed at each end of the tracks 94 to prevent the rollers 100 from extending beyond the end of the tracks 94.

Two or more casters or rollers 100 spaced apart lengthwise ride inside each track 94 and are attached by their shanks 102 with a roller support member or tube 104. This roller support member with associated rollers 100 is held substantially parallel and vertical with the trencher attachment and rides upon the rollers 100 which further rides freely up and down within the length of the tracks 94 while the tracks 94 preferably remain fixed with the trencher attachment 60.

A left wing 63 is attached to the roller support member 104 and a right wing 62 is attached to the roller support member 104 with a wing bracket 110. This allows both wings 62 to float with the roller attachment 104. While both wings 62 direct loose soil away from the trench to both sides, the left wing 63 is positioned and shaped to retain loosened soil near the flights 14 in order to move the soil toward the right side of the flights 14. That is, the left wing 63 has an approximately "Z" cross section with a leg of the "Z" covering or overlapping a portion of the auger 12. Loose soil on the right side is directed out and away from the trench by the right wing 62 thereby leaving the left side of the trench clear of soil. This allows an operator to work on the left side of the trench without concern of spilling loose soil into the trench. The left wing 62 may also be positioned and shaped to move the loosened soil to the left side of the trench.

For this still further alternative embodiment, a wheel 106 is preferably attached with the roller support member 104 utilizing a wheel bracket 108. This allows the wheel 106 to roll on the soil surface and control the height of the floating attachment 92 and the wings 62 which are attached to the roller support member 104. The wheel 106 may also be vertically adjustable. Spring(s), weight(s), and actuator(s) including electric, hydraulic, or mechanical types, may be utilized to place a downward force on the floating attachment 92 or roller support member 104. This allows the wheel 106 to be held firmly on the soil surface and prevents undesired lift of the wings 62 above the loosened soil.

The float attachment 92 may be pivotally mounted at the upper ears 96 with shear bolts, spring loaded clamps, or other release mechanisms at the lower ears 98 that allow the floating attachment 92 to swing rearward if a wing 62 encounters an overload that will occur when encountering obstacles such as partially buried rocks, concrete, metal or other large debris.

The method of utilization of the present art apparatus 10 is unique. The user first assembles the apparatus 10 as previously described and attaches with a tractor three point hitch or another movable carriage. The user then attaches the input shaft 34 to a source of rotational power such as a three point power takeoff or other external or integrated engine or motor. If the user desires to mix fertilizer, organic materials, or mulch with the soil, the user may simply spread such onto the soil to be tilled. The user then lowers the rotating auger 12 into the soil to a desired level. Once positioned, the user begins a forward movement of the tractor or carriage. As moved through the soil, the auger loosens and breaks up the soil to a depth heretofore not possible with conventional rotary garden tilling devices and deeply mixes any surface fertilizers, organic materials, or mulch. Furthermore, the rotating auger 12 is capable of breaking up compacted and hardened soils which conventional rotary tillers simply skim off. As the auger 12 is moved through the soil, it refills the area immediately behind with loose soil which is highly desirable for plant growth.

The method of utilization as a trencher follows the aforesaid procedure with the exception that the trencher attachment 60 is connected with the apparatus 10. As the tractor or movable carriage moves forward, soil within the trench is directed towards the surface and the ears or wings 62 move it onto both sides of the trench with the rear guard or shroud or trough 64 prohibiting refilling of the trench.

The present art apparatus 10 may be manufactured from a plurality of materials including but not limited to metallic materials such as steel or aluminum, composites, and other materials capable of withstanding the forces presented during the use of the apparatus 10. In the preferred embodiment, the apparatus 10 is manufactured from a carbon steel. The apparatus 10 may also be manufactured via machining, casting, piece welding, or a plurality of generally accepted methods.

Although described for enablement purposes, the lengths, widths, and other dimensional attributes may depart significantly from those specified. The shape, size, location, component numbers and mounting methods utilized for each of the components or constituent elements may take a plurality of forms as recognized within the pertinent arts without departing from the scope and spirit of the present invention. The auger 12 is described as extending substantially perpendicularly to the soil surface yet in alternative embodiments, the auger 12 may have any angle relative to the soil surface.

Having described the invention in detail, those skilled in the art will appreciate that modifications may be made to the invention and its method of use without departing from the spirit herein identified. Therefore, it is not intended that the scope of the invention be limited to the specific embodiments illustrated and described. Rather, it is intended that the scope of this invention be determined by the appended claims and their equivalents.

What is claimed is:

1. A horizontal auger tilling apparatus comprising:
    an inner frame having a left side, a right side, and a bottom side; and
    said inner frame pivotally mated and retained with an outer frame; and
    a gear box mounted with said inner frame, said gear box having an input shaft and an output shaft; and
    an auger having one or more flights and an auger shaft; and
    a bearing mount assembly mounted with said inner frame toward said bottom side relative to said gear box and having one or more bearing assemblies; and
    said auger shaft rotationally held with said bearing assemblies and said bearing mount assembly and coupled with said output shaft of said gear box thereby limiting any movement of said auger shaft relative to said inner frame; and
    said auger shaft and said auger flights extending past said bottom side of said inner frame; and
    said input shaft of said gear box capable of receiving a rotational torque from a rotational power source and transferring said rotational torque to said output shaft and thereby said auger; and
    said outer frame having a base having a shape capable of mounting with a movable carriage and said outer frame formed to allow a movement of said outer frame to move said auger laterally through one or more soils and said rotational torque on said auger capable of loosening the one or more soils; and
    said inner frame retained with said outer frame in a fashion that should said auger encounter an obstruction said inner frame pivots relative to said outer frame and thereby said auger rides over the obstruction; and
    said inner frame is retained with said outer frame with one or more pivot shafts; and
    a release mechanism between said inner frame and said outer frame holding said inner frame with said outer frame and allowing said release mechanism to release said inner frame from said outer frame should said auger encounter the obstruction and allowing said inner frame to pivot relative to said outer frame.

2. The horizontal auger tilling apparatus as set forth in claim 1, further comprising:
    a trencher attachment attached with said inner frame via one or more trencher attachment ears; and
    said trencher attachment having one or more extending wings canted toward a rearward direction and shaped to divert the one or more soils to one or more sides of said auger; and
    a rear guard or shroud attached with said trencher attachment and located behind said auger and extending at least a portion of a length of said auger flights and shaped to allow said auger to lift the one or more soils toward said extending wings.

3. The horizontal auger tilling apparatus as set forth in claim 1, further comprising:
    a floating trencher attachment having one or more tracks attached with said inner frame; and
    a roller support member having two or more rollers; and
    said two or more rollers located within said one or more tracks and positioned to allow said roller support member to ride freely in an up and down direction; and
    said floating trencher attachment having one or more extending wings attached with said roller support member and canted toward a rearward direction and shaped to divert the one or more soils to one or more sides of said auger; and
    a rear guard or shroud attached with said inner frame and located behind said auger and extending at least a portion of a length of said auger flights and shaped to allow said auger to lift the one or more soils toward said extending wings.

4. The horizontal auger tilling apparatus as set forth in claim 3, said one or more extending wings further comprising:
    a right wing attached with said roller support member and canted toward a rearward direction; and
    a left wing attached with said roller support member and positioned and shaped to retain the one or more soils near said flights of said auger.

5. The horizontal auger tilling apparatus as set forth in claim 3, further comprising:
    a gauge wheel attached with said roller support member at a position allowing said gauge wheel to roll upon a surface of the one or more soils and to control a height of said one or more extending wings.

6. The horizontal auger tilling apparatus as set forth in claim 4, further comprising:
    a gauge wheel attached with said roller support member at a position allowing said gauge wheel to roll upon a surface of the one or more soils and to control a height of said one or more extending wings.

7. The horizontal auger tilling apparatus as set forth in claim 1, whereby:
    said inner frame is retained with said outer frame with one or more pivot shafts extending from said inner frame and pivotally mated with one or more pivot holes within said outer frame; and
    said release mechanism comprising a shear tab having a first leg and a second leg; and
    said second leg attached with said outer frame; and
    said first leg having a shear pin hole positioned near a shear pin receiving hole with said inner frame; and
    said release mechanism further comprising a shear pin or bolt through said shear pin hole and said shear pin receiving hole thereby allowing said shear pin or bolt to break should said auger encounter the obstruction and allowing said inner frame to pivot on said one or more pivot shafts.

8. The horizontal auger tilling apparatus as set forth in claim 1, whereby:

said movable carriage comprises a tractor having a three point hitch; and said base of said outer frame is formed to mate with one or more lifting arms of the three point hitch; and said outer frame formed to receive a top link of the three point hitch; and said movement of said outer frame provided by the tractor; and said a rotational power source comprises a power drive shaft coupled with said input shaft and a power takeoff of the tractor.

9. The horizontal auger tilling apparatus as set forth in claim 7, whereby:

said movable carriage comprises a tractor having a three point hitch; and said base of said outer frame is formed to mate with one or more lifting arms of the three point hitch; and said outer frame formed to receive a top link of the three point hitch; and said movement of said outer frame provided by the tractor; and said a rotational power source comprises a power drive shaft coupled with said input shaft and a power takeoff of the tractor.

10. The horizontal auger tilling apparatus as set forth in claim 7, further comprising:

a motion limiter mounted with said gear box or said inner frame and positioned to limit angular movement of said inner frame relative to said outer frame should said auger encounter the obstruction.

11. A method of horizontally tilling soil, the steps comprising:

forming an inner frame with a left side, a right side, and a bottom side; and forming an outer frame; and pivotally mating and retaining said inner frame with said outer frame with one or more pivot shafts extending between said inner frame and said outer frame; and further retaining said inner frame with said outer frame via forming a release mechanism between said inner frame and said outer frame; and mounting a gear box with said inner frame, said gear box having an input shaft and an output shaft; and forming an auger having one or more flights and an auger shaft; and mounting a bearing mount assembly with said inner frame toward said bottom side relative to said gear box and forming one or more bearing assemblies within said bearing mount; and placing and holding said auger shaft rotationally with said bearing assemblies; and coupling said auger shaft with said output shaft of said gear box; and limiting any movement of said auger shaft relative to said inner frame; and positioning said auger flights past said bottom side of said inner frame; and placing a rotational torque upon said input shaft of said gear box; and transferring said rotational torque to said output shaft and thereby rotating said auger; and lowering said auger into one or more compacted soils to a desired level; and moving said outer frame with a forward movement and imparting said forward movement onto said auger; and loosening and breaking up the one or more compacted soils with said rotating of said auger as said auger receives said forward movement; and refilling an area behind said auger with a loose soil; and allowing said release mechanism to release said inner frame from said outer frame from said further retaining of said inner frame with said outer frame should said auger encounter an obstruction.

12. The method of horizontally tilling soil as set forth in claim 11, the steps further comprising:

pivoting said inner frame relative to said outer frame should said auger encounter an obstruction; and riding said auger over the obstruction via said pivoting of said inner frame and said moving of said outer frame.

13. A method of horizontally trenching soil, the steps comprising:

forming an inner frame with a left side, a right side, and a bottom side; and forming an outer frame; and pivotally mating and retaining said inner frame with said outer frame with one or more pivot shafts extending between said inner frame and said outer frame; and further retaining said inner frame with said outer frame via forming a release mechanism between said inner frame and said outer frame; and mounting a gear box with said inner frame, said gear box having an input shaft and an output shaft; and forming an auger having one or more flights and an auger shaft; and mounting a bearing mount assembly with said inner frame toward said bottom side relative to said gear box and forming one or more bearing assemblies within said bearing mount; and placing and holding said auger shaft rotationally with said bearing assemblies; and coupling said auger shaft with said output shaft of said gear box; and limiting any movement of said auger shaft relative to said inner frame; and positioning said auger flights past said bottom side of said inner frame; and forming a trencher attachment and attaching said trencher attachment with said inner frame; and forming one or more extending wings onto said trencher attachment; and canting said extending wings toward a rearward direction; and shaping said extending wings to divert one or more soils to one or more sides of said auger; and attaching a rear guard or shroud with said trencher attachment behind said auger and extending said guard or shroud at least a portion of a length of said auger flights; and shaping said rear guard or shroud to allow said auger to lift the one or more soils toward said extending wings; and placing a rotational torque upon said input shaft of said gear box; and transferring said rotational torque to said output shaft and thereby rotating said auger; and lowering said auger into the one or more soils to a desired level; and floating said extending wings upon a surface of the one or more soils; and moving said outer frame with a forward movement and imparting said forward movement onto said auger; and loosening and breaking up the one or more soils with said rotating of said auger as said auger receives said forward movement; and moving and diverting with said extending wings the one or more soils which were loosened and broken up to the sides of said auger; and prohibiting a refilling of an area behind said auger with a loose soil; and allowing said release mechanism to release said inner frame from said outer frame from said further retaining of said inner frame with said outer frame should said auger encounter an obstruction.

14. The method of horizontally tilling soil as set forth in claim 13, the steps further comprising:

pivoting said inner frame relative to said outer frame should said auger encounter the obstruction; and riding said auger over the obstruction via said pivoting of said inner frame and said moving of said outer frame.

\* \* \* \* \*